United States Patent [19]

Cameron

[11] Patent Number: 4,659,116

[45] Date of Patent: Apr. 21, 1987

[54] PIPE UNION FOR CRYOGENIC FLUIDS

[75] Inventor: Donald C. Cameron, Tulsa, Okla.

[73] Assignee: Dowell Schlumberger Incorporated, Tulsa, Okla.

[21] Appl. No.: 728,077

[22] Filed: Apr. 29, 1985

[51] Int. Cl.[4] ............................................. F16L 19/00
[52] U.S. Cl. ........................................ 285/27; 285/311;
 285/332.1; 285/347; 285/354; 285/904
[58] Field of Search ............. 285/347, DIG. 5, 332.3,
 285/261, DIG. 22, 354, 353, 24, 27, 332.2,
 332.1, 311

[56] References Cited

U.S. PATENT DOCUMENTS

| | | | |
|---|---|---|---|
| 593,190 | 11/1897 | Bernhardt | 285/347 |
| 655,088 | 7/1900 | Kane . | |
| 794,110 | 7/1905 | McDowell | 285/332.1 X |
| 1,220,868 | 3/1917 | McSwain | 285/311 X |
| 1,293,615 | 2/1919 | Mitchell et al. . | |
| 2,516,743 | 7/1950 | Allin . | |
| 2,521,127 | 9/1950 | Price . | |
| 2,574,625 | 11/1951 | Coss | 285/332.2 X |
| 2,889,847 | 6/1959 | Schober | 285/DIG. 22 x |
| 2,971,782 | 2/1961 | Sparkman | 285/332.2 |
| 3,001,804 | 9/1961 | Tomlinson et al. | 285/347 X |
| 3,047,025 | 7/1962 | Davis | 285/DIG. 22 X |
| 4,030,850 | 6/1977 | Hyde | 285/DIG. 22 X |
| 4,165,106 | 8/1979 | Gladden | 285/354 X |
| 4,324,423 | 4/1982 | Pitesky | 285/156 |
| 4,434,811 | 3/1984 | Murdoch | 137/515 |
| 4,474,392 | 10/1984 | Vassallo et al. | 285/347 |
| 4,575,044 | 3/1986 | Gentry | 285/354 X |

FOREIGN PATENT DOCUMENTS

| | | | |
|---|---|---|---|
| 2812884 | 9/1978 | Fed. Rep. of Germany | 285/DIG. 22 |
| 3001991 | 7/1981 | Fed. Rep. of Germany | 285/311 |
| 1098480 | 7/1955 | France | 285/347 |
| 984947 | 3/1965 | United Kingdom | 285/354 |

Primary Examiner—Thomas F. Callaghan
Attorney, Agent, or Firm—L. Wayne White

[57] ABSTRACT

A union for joining pipes, tubing, or other fluid conduits in a fluidtight manner includes male and female parts having respective inner fluid passages. The male part has a contoured lead end that slidably engages the female lead end which has a complementary contour with respect to the male lead end. The male lead end has a circumferential recess which retains a resilient sealing member which is radially compressed between the mated, contoured lead ends when the male and female parts are joined together. Clamping means is provided to hold the male and female parts together, but the fluidtight seal is independent of the clamping means. The mated contoured lead ends substantially eliminate transverse movement at the sealing interface and permit a camming action when the male and female parts are joined so as to self-align the respective inner passages.

18 Claims, 4 Drawing Figures

PIPE UNION FOR CRYOGENIC FLUIDS

BACKGROUND OF THE INVENTION

1. Technical Field

The invention relates to unions and couplings for pipes, tubing, and other fluid conduits.

2. Description of the Related Art

Many kinds of unions, couplings, and fittings have been designed in order to achieve fluidtight engagement of two or more pipe ends and other fluid conduits. Such couplings typically include at least two mated parts, male and female, which when connected form a fluidtight seal by compressing a sealing element such as an O-ring. Sometimes the mechanical complexity of a fitting results in a diminution of serviceability or convenience of use. It is important that a coupling permit quick-connect and disconnect, as well as maintaining seal integrity at the seal interface by preventing leakage of the fluid flowing through the piping.

When the conducted fluid is cryogenic in nature, the associated problems of seal integrity and usability of a coupling are compounded, due to the extremely low temperatures to which the seal and coupling elements are exposed. In particular, known couplings which primarily rely on transverse axial compression of a sealing element, such as a common O-ring, by tightening of a lug nut or similar means, have proven unsatisfactory because the cryogenic temperatures result in a loss of torque on the nut due to dimensional changes of the nut and its associated threaded shaft. Also, changes in characteristics of the sealing element, such as its resiliency, can occur at the low temperatures. When such changes result in a loss of the seal integrity, the cryogenic fluid quickly escapes the conduits and vaporizes; the fluid can also crystallize so as to block flow of the fluid in the piping or conduit with the result of having to shut down the equipment demanding the fluid flow and then re-opening the fluid flow path.

In order to form and maintain a fluidtight seal, known devices have utilized high torque couplings and/or tight interface tolerances between the male and female mating surfaces and the sealing elements. One of the problems with using close tolerances on the mated parts is that assembly can be difficult in order to align the respective fluid passages in the mated male and female parts.

Self-aligning couplings are known and typical examples are shown in U.S. Pat. Nos. 655,088, issued to Kane, and 1,293,615, issued to Mitchell et al. These couplings are undesirable as they do not provide means for securely holding the pipe sections together, which is a necessity when using cryogenic fluids. These known couplings also do not prevent transverse movement or bending of the connected pipes at the coupling interface.

Other known types of couplings are shown in U.S. Pat. Nos. 2,971,782, issued to Sparkman et al., and 2,516,743, issued to Allin. While these devices provide, at least to some degree, a self-aligning coupling, they are deficient in that either they permit undesired transverse and longitudinal movement between the connected pipes or a coupling torque nut is needed to minimize such movement and effectuate the seal.

SUMMARY OF THE INVENTION

The disclosed invention provides a new and useful union for joining pipe sections in a fluidtight manner, which is particularly suited for use with cryogenic fluids. According to one aspect of the invention, a union is contemplated which achieves a fluidtight seal without relying on the degree of tightness of torque nut or other clamping means for holding the pipes and coupling together.

According to another aspect of the invention, a union is shown which provides male and female parts contoured in a complementary manner which, when mated, self-align the internal fluid passages. The self-alignment feature permits the use of very close tolerances between the mating parts in order to achieve a fluidtight seal. The seal is formed at the interface between mating surfaces by a resilient sealing element.

According to another aspect of the invention, a complementary contoured design of two cooperating parts is shown which permits a sliding engagement when the parts are mated so as to self-align the parts by a camming action between associated portions of the mated parts. The disclosed complementary contoured design also substantialy eliminated lateral movement at the interface of the mated parts.

Another aspect of the invention contemplates a fluidtight union having means for holding or clamping two cooperating parts together to prevent longitudinal separation thereof, wherein the fluidtight seal in the union is formed independently of the holding means.

These and other aspects of the present invention will be more fully described and understood in the following specification in view of the accompanying drawings.

PREFERRED EMBODIMENT OF THE INVENTION

Figure 1:
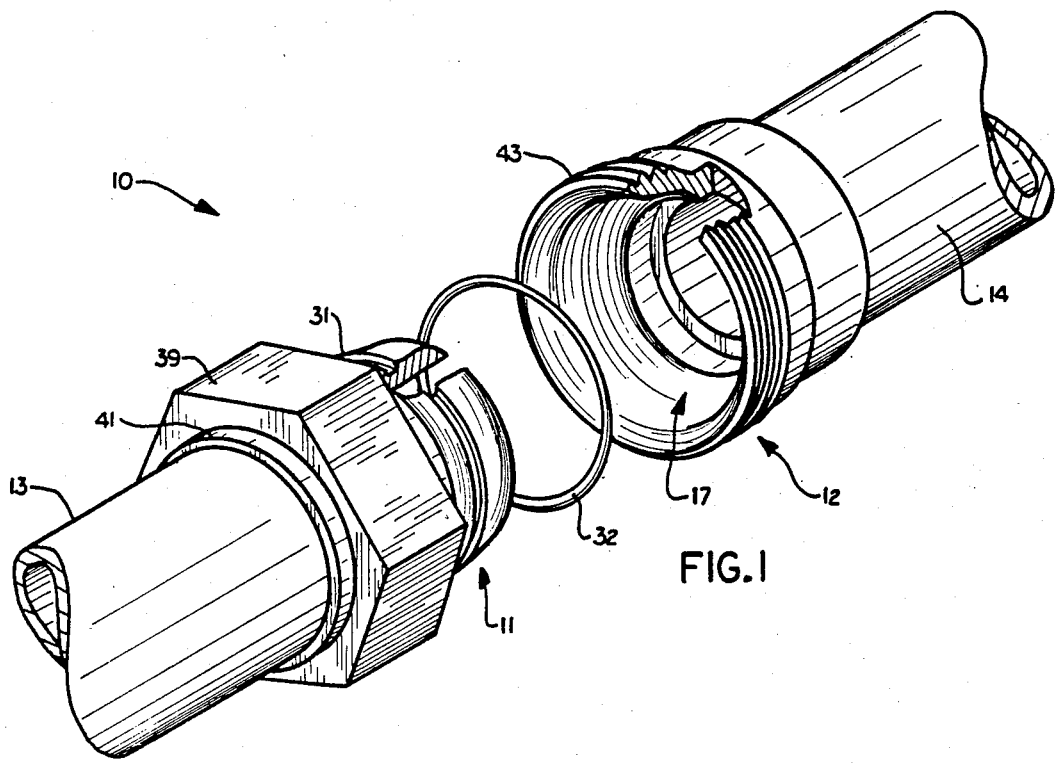
FIG. 1 is an exploded, perspective view of a union in partial section according to the present invention.

A fluidtight union for joining the sections of piping, tubing, or other fluid conduits together in endwise fashion is generally indicated by the numeral 10 in FIGS. 1–4. The present invention broadly contemplates the union 10 as having a male part 11 and a female part 12 respectively mounted on the ends of two pipes or fluid conduits 13 and 14 which are to be connected together in fluidtight communication with each other.

The male and female parts 11,12 are generally cylindrical in nature and provide internal fluid passages 16 and 17, respectively in fluid communication with the associated pipes 13,14, as shown.

Preferably, one end 18 of the male part 11 is threadedly engaged with an associated threaded end of the pipe 13. Similarly, the female part 12 has one end 19 threadedly engaged with an associated threaded end of the pipe 14. To ensure a fluidtight engagement between the male and female parts 11,12 and the pipes 13,14 annular welds or brazing 21 can be used. The welds also prevent the male and female parts from backing off their respective pipes.

Figure 2:
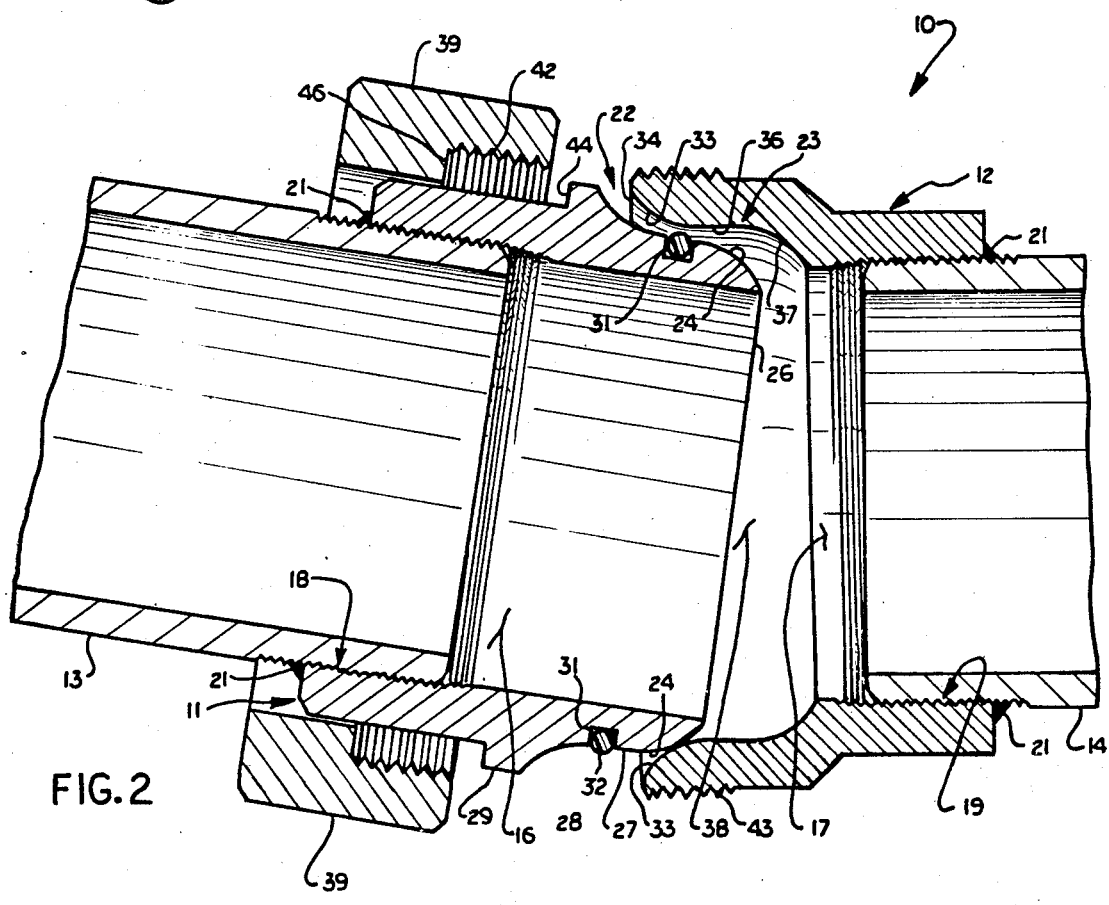
FIG. 2 is a longitudinal section of the union shown in FIG. 1, the mating parts being shown with the male end being not guite engaged with the female end.

The male part 11 has a contoured lead end 22 which cooperates with a complementary contoured lead end 23 of the female part 12 to form a mateable pair of elements of the union 10. Referring to FIG. 2, the male contoured lead end 22 presents a longitudinally flared outer surface somewhat in the form of an elongated-S shape. The outer contoured surface includes a convex portion 24 extending from an open distal end 26 of the male part 11 to one end of a generally longitudinally straight portion 27. The straight portion 27 extends from the convex portion 24 to a concave portion 28. The concave portion 28 forms in part an annular flange 29, the purpose of which will be more fully described hereinafter.

The male lead end 22 has an annular circumferential recess 31 formed in the straight portion 27 of the outer contoured surface. A resilient annular sealing element 32, for example a conventional elastomeric O-ring, is retained in the recess 31 as shown. The radial depth of the recess 31 is less than the cross-sectional width of the sealing element 32 so that an outer peripheral portion of the O-ring extends radially beyond the male lead end 22 outer contoured surface.

Figure 3:
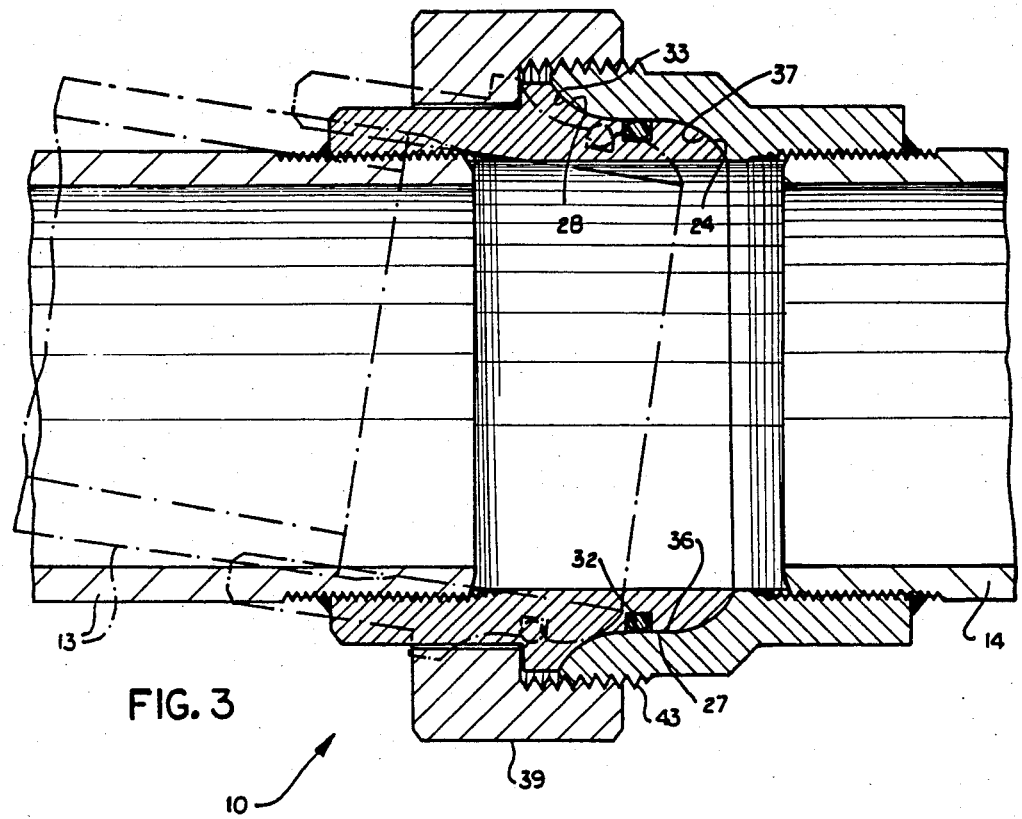
FIG. 3 is a longitudinal section of the union shown in FIG. 1, with the male and female parts fully mated and engaged, and with the view of FIG. 2 being shown in phantom.

As shown in FIGS. 2 and 3, the female lead end 23 has an interior wall structure or surface which is complementary to the male lead end 22. Thus, the female lead end presents a longitudinally tapered inner surface in the form of an S-shape symmetric with the male end 22. The contoured inner surface of the female end 23 includes a convex portion 33 extending from an open distal end 34 of the female part 12 to one end of a generally longitudinally straight portion 36. The straight portion 36 extends from the convex portion 33 to a concave portion 37.

The female contoured lead end 23 forms a sleeve-like opening 38 into which the male end 22 is slidably inserted, as shown in FIG. 3. The cooperating contoured surfaces of the male and female parts 11,12 mate together in complementary fashion. By maintaining close tolerances of the contoured mating surfaces, a fluidtight seal is formed by radial compression of the O-ring 32 between the female straight portion 36 and the recess 31. As best shown in FIG. 3, the portion of the sealing element 32 which radially extends beyond the recess 31 slidably engages the female lead end 23 and is radially compressed when the male end 22 is fully seated in the female end 23. The recess 31 is preferably dimensioned to maximize compression of the O-ring while still retaining the O-ring in place.

By way of example, a typical union made in accordance with the invention is preferably made of stainless steel. The male part 11 is approximately 4 inches in length, with the inner fluid passage 16 being about 4.2 inches in diameter. The female part 12 is approximately 3.5 inches in length and the inner fluid passage 17 is about the same diameter as the corresponding fluid passage 16 in the male part.

On the male contoured lead end 22, the convex portion 24 and the concave portion 28 have a 0.750 inch radius bridged by the straight portion 27, which is about 0.5 inch long at a radial distance of 2.5 inches from the longitudinal center axis of the male part 11. The female contoured lead end 23 is complementary to the male end 22, and thus the female convex and concave portions 33,37 have a 0.750 inch radius bridged by the straight portion 36 having a 0.5 inch length at a radial distance of 2.5 inches from the longitudinal center axis of the female part 11. The tolerances on the radial distances of the straight portions 27 and 36 are kept to within 0.008 inch in order to ensure a fluidtight seal when the male lead end 22 is inserted into the female lead end 23.

It should now be apparent from FIG. 3 that because of the narrow tolerances maintained between the male and female lead ends, when the male and female parts 11,12 are mated or joined, the convex portions 24 and 33 will engage with a camlike action, resulting in self-alignment of the inner fluid passages 16 and 17. This is particularly helpful when the male and female parts 11,12 are initially engaged at an angle as shown in phantom in FIG. 3. It does not matter that the parts 11,12 are not initially aligned because the camming engagement will automatically align the parts when the male end 22 is fully inserted in the female end 23. This features allows for very quick and simple connect and disconnect while assuring an excellent fluidtight seal.

Referring to FIG. 2, a locking nut 39 is provided on the male part 11 and is retained on the male part by a conventional collar 41. The nut 39 includes an axially threaded bore 42 which cooperates with a threaded distal end 43 of the female part 12. The annular flange 29 presents a shoulder 44 against which a surface 46 at the terminal end of the threaded bore 42 is fully seated, when the male and female parts 11,12 are engaged and the nut 39 is threadedly connected to the female distal end (see FIG. 3). When the nut 39 is tightened down so as to seat the end 46 against the flange shoulder 44, the male and female parts 11,12 are firmly joined and will not separate longitudinally or otherwise unless the nut 39 is backed off the female end.

It is to be noted, however, that the fluidtight seal formed between the mated contoured surfaces 22,23 by the O-ring 31 is not dependent on the presence of the nut 39 threaded onto the female part, nor is the fluidtight seal dependent on the torque applied to the nut 39. The fluidtight seal is formed when the cooperating male and female contoured lead ends 22,23 are fully engaged; this engagement causes the radial compression of the sealing element 32. Tightening down the nut 39 against the flange shoulder 44 provides a positive clamping of the male and female parts 11,12 together to prevent accidental separation; however, seal integrity is maintained even when the nut 39 is loosened. Thus, there is no reliance on the torque applied to the nut 39 to maintain the fluidtight seal.

The disclosed union 10 according to the teachings of the present invention is particularly suited for use with cryogenic fluids such as liquid carbon dioxide; however, the union can be conveniently used in many other applications for endwise joining of pipe sections, as will be appreciated by those skilled in the art.

An important aspect of the present invention is that the fluidtight seal is not dependent on the torque applied to the nut 39. The extreme low temperatures to which the union is exposed when cryogenic fluids are used can cause dimensional changes which allow the nut 39 to loosen, but, since the seal is not dependent on axial compression of the O-ring 31, the seal integrity is maintained.

Another important aspect of the invention is the nature of the engaged portions of the complementary contoured mated surfaces of the male and female lead ends 22,23. As shown in FIG. 3, when fully engaged, the female convex portion 33 is seated in the male concave portion 28, the male convex portion 24 is seated in the female concave portion 37, and the two generally straight portions 36 and 27 are abutted against each other. The somewhat elongated-S type shape of the cooperating male and female engaged portions substantially eliminates any lateral movement of the male and female parts 11,12, particularly at the interface of the contoured mated ends where the fluidtight seal is formed. Such lateral movement, particularly any bending at the seal interface, can cause loss of seal integrity and is very undesirable when cryogenic fluids are bending used. The elongated-S contour minimizes such lateral movement even when the nut 39 is not fully or properly threaded onto the female end 43. The elongated-S contour also reduces the tendency of the male and female parts 11,12 to move longitudinally with respect to each other due to the tight tolerances maintained between the complementary male and female contoured lead ends 22,23.

The disclosed contoured shape also permits the self-alignment feature previously described. The self-alignment feature allows for much tighter tolerance control of the male and female lead ends 22,23 to maximize radial compression of the O-ring 32 when the parts are mated together.

Figure 4:
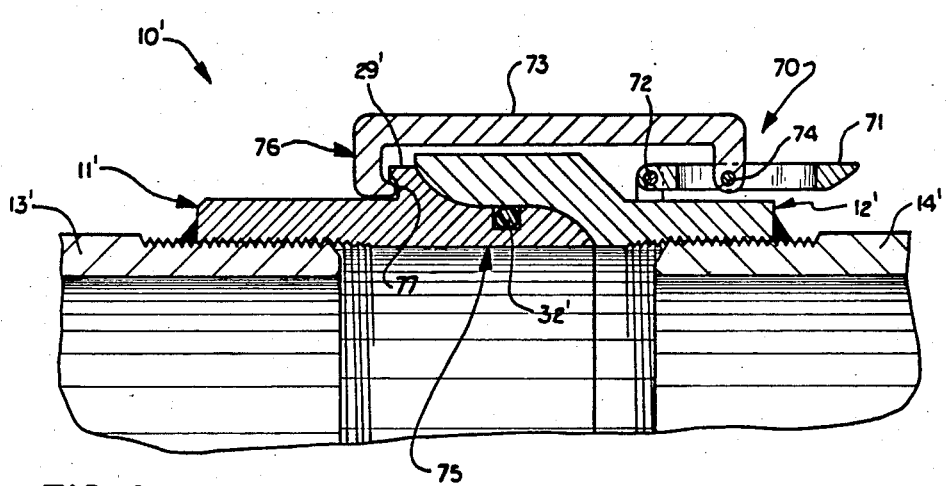
FIG. 4 is a partial longitudinal section showing another embodiment of the means for holding the union elements and piping together.

FIG. 4 shows another embodiment of a clamping means for holding the male and female parts 11',12' together. Like numerals followed by a prime (') indicate corresponding elements with respect to FIGS. 1–3. In place of the threaded nut 39 and the threaded female end 43, a locking clamp assembly 70 is used. The assembly 70 is a hinge and snap type clamp and includes an actuator lever 71 which is hinged to the female part 12 by a pivot pin 72. A locking bar 73 is pivotally connected at one end to the lever 71 by another pivot pin 74. The locking bar 73 extends longitudinally across the sealing interface of the union 10'. The locking bar 73 has a U-shaped hook portion 76 which is adapted to engage a recess 77 in the annular flange 29'.

Operation of the clamp assembly 70 is straight forward. To release the clamp, the lever 71 is lifted upwards (counterclockwise rotation as viewed in FIG. 4). The pivoted connection to the bar 73 causes a longitudinal push on the bar 73, which backs the hook 76 out of the flange recess 77. The bar 73 can then be swung out of engagement and the male and female parts 11',12' can be separated. The release of the clamp 70, however, in and of itself, does not break the seal integrity. As with the locking nut 39 arrangement shown in FIGS. 1–3, the fluidtight seal is not dependent on the clamping action of the assembly 70. This is because the fluid-tight seal is primarily formed by radial compression of the O-ring between the contoured mated portions 22', 23'. To engage the clamp assembly 70, the above-stated sequence is reversed.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A union useful for joining cryogenic fluid conduits in a fluidtight manner, comprising a male part and a female part adapted to be mounted on respective ends of the fluid conduits, said male part having a first inner fluid passage and said female part having a second inner fluid passage, said male and female parts providing respective complementary contoured lead ends, said male contoured lead end having a rounded convex portion extending from the open end, and said female contoured lead end having a rounded convex portion extending from the open end, one of said male and female contoured lead ends having a continuous outer circumferential slot with a resilient sealing member disposed therein, the male and female ends also having a rounded concave portion, said male and female contoured lead ends cooperating by having the convex portions initially cam against one another when joined together to self-align said first and second fluid passage and the concave portion of the female part receiving and engaging the convex portion of the male part and the concave portion of the male part receiving and engaging the convex part of the female part and forming a fluidtight seal by substantially radial compression of the resilient sealing member by the male and female parts, said fluidtight seal being formed independently of operation of a clamping means, and means for releasably clamping the male and female parts together by utilizing a flange portion to prevent longitudinal separation of the male and female parts.

2. A union as set forth in claim 1, wherein said male and female contoured lead ends provide cooperating engaged portions which when said lead ends are joined together substantially eliminate lateral movement at the interface of the male and female parts.

3. A union as set forth in claim 2, wherein said male contoured lead end has its convex portion extending from an open distal end of the male part to a generally straight portion extending from said convex portion to the concave portion extending from said straight portion to a flange portion, and said circumferential slot being formed in said male straight portion.

4. A union as set forth in claim 3, wherein said female contoured lead end provides a convex portion extending from an open distal end of the female part to a generally straight portion extending from said convex portion to a concave portion.

5. A union as set forth in claim 4, wherein said male and female straight portions are substantially longitudinally parallel with said inner fluid passages.

6. A union as set forth in claim 5, wherein said clamping means includes a nut on the male part adapted to be threadedly engaged with threads on the female part to hold the parts together.

7. A union as set forth in claim 5, wherein said clamping means is a locking bar hinged at one end to the female part and having a hooked opposite end, said hooked end engaging said flange on the male part, said locking part being movable longitudinally to operably clamp and release the male and female parts.

8. A fluidtight union useful for cryogenic fluids comprising a male part and a female part both providing respective inner fluid passages and cooperating contoured mating portions, said male contoured portion being longitudinally flared and having a convex portion extending from the open end to a concave portion and said female part having a convex portion extending from the open end to a concave portion, the female convex and concave portions receiving and engaging the concave and convex portions respectively of the male part, a continuing circumferential recess retaining a resilient sealing element on the one of the male and female parts, said cooperating contoured mating portions permitting a sliding engagement to self-align said fluid passages in fluid communication by the camming of said convex portions if the parts are not initially aligned and forming a fluidtight seal by radial compression of said resilient element between the male and female parts, and means for releasably holding the male and female parts together to prevent longitudinal separation thereof including a flange on one part and a grasping means on the other, wherein said fluidtight seal is formed during said sliding engagement.

9. A union as set forth in claim 8, wherein said male contoured mating portion has its convex portion extending from an open distal end of the male part to one end of a generally straight portion and the concave portion extending from an opposite end of said straight portion, said cooperating female contoured mating portion being complementary to said male contoured mating portion wherein a camming engagement between said male and female contoured portions aligns said inner fluid passage when the male part is slidably inserted into the female part and said cooperating complementary mated portions minimize lateral movement at a sealing interface of the male and female parts.

10. A union as set forth in claim 9, wherein said circumferential recess is formed in said male straight portion.

11. A union as set forth in claim 9, wherein said female contoured mating portion has its longitudinally tapered convex portion extending from an open distal end of the female part to one end of a generally straight portion and the concave portion extending from an opposite end of said straight portion, said female convex portion and said male convex portion initially engaging with a camming action when the male and female parts are mated together to align said inner fluid passages.

12. A union as set forth in claim 11, wherein when the male and female parts are mated together, said female convex portion engages said male concave portion, said female concave portion engages said male convex portion, and said male and female straight portions abut each other and radialy compress said resilient sealing element, said mated contoured complementary portions forming an elongated-S interface area which substantially reduces lateral movement and bending at said interface.

13. A union as set forth in claim 8, wherein said fluidtight seal is formed independently of operation of said holding means.

14. A union as set forth in claim 8, wherein said clamping means includes a nut on the male part adapted to be threadedly engaged with the female part to hold the parts together.

15. A union as set forth in claim 14, wherein the male part has an annular flange and said nut has a threaded bore which is adapted to engage a threaded distal end of the female part, said flange forming a shoulder which engages a surface at a terminal end of said bore when said nut is threaded onto the female part, thereby holding the male and female parts together.

16. A union as set forth in claim 8, wherein said clamping means is a locking bar hinged at one end to the female part and having a hooked opposite end, said hooked end engaging the flange on the male part, said locking bar being movable longitudinally to operably clamp and release the male and female parts.

17. A separable fluidtight union for joining fluid conduits comprising a male part and a female part both providing respective inner fluid passages and cooperating ends, the male end being longitudinally flared and having a convex portion and a concave portion bridged by a straight portion, said female end being longitudinally tapered and having a convex and concave contour complementary to receive and engage the male end, and sealing means associated with the male mating end, said male and female mating ends forming an elongated-S sealing interface when joined together which self-aligns said inner fluid passages and minimizes lateral movement at said interface, and means for holding the male and female parts together and preventing longitudinal separation thereof, said sealing interface being formed by the male and female mated ends independently of said holding means.

18. A union according to claim 17, wherein said sealing means is an annular elastomeric element retained in a circumferential groove formed in said male straight portion, said elastomeric element being radially compressed between said male and female mating ends when joined together.

* * * * *